(12) United States Patent
Brown et al.

(10) Patent No.: US 7,099,652 B2
(45) Date of Patent: Aug. 29, 2006

(54) ORIGINATING A BILLED TRANSACTION FOR AN ORIGIN TELEPHONY DEVICE

(75) Inventors: Michael Wayne Brown, Georgetown, TX (US); Joseph Herbert McIntyre, Austin, TX (US); Michael A. Paolini, Austin, TX (US); James Mark Weaver, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 10/023,406

(22) Filed: Dec. 17, 2001

(65) Prior Publication Data

US 2003/0114139 A1 Jun. 19, 2003

(51) Int. Cl.
- H04M 11/00 (2006.01)
- H04M 1/66 (2006.01)
- H04M 1/68 (2006.01)
- H04M 3/16 (2006.01)

(52) U.S. Cl. ............. 455/406; 455/411; 455/563; 705/67; 379/114.21; 379/121.02

(58) Field of Classification Search ........ 455/405–408, 455/411, 414.1, 414.3, 415, 563; 379/114.19, 379/114.21, 114.2, 126, 127.01, 93.12, 114.23, 379/114.22, 121.02, 114.26; 705/64, 67, 705/400

See application file for complete search history.

(56) References Cited

U.S. PATENT DOCUMENTS

| | | | |
|---|---|---|---|
| 5,148,474 A | 9/1992 | Haralambopoulos et al. | |
| 5,206,899 A | 4/1993 | Gupta et al. | 379/120 |
| 5,381,467 A | 1/1995 | Rosinski et al. | 379/121.01 |
| 5,499,288 A | 3/1996 | Hunt et al. | 379/88 |
| 5,568,541 A | 10/1996 | Greene | |
| 5,602,907 A | 2/1997 | Hata et al. | 379/114.22 |
| 5,652,786 A * | 7/1997 | Rogers | 379/91.01 |
| 5,673,404 A | 9/1997 | Cousins et al. | 395/347 |
| 5,715,298 A * | 2/1998 | Rogers | 379/91.01 |
| 5,754,633 A | 5/1998 | Levy | 379/114.21 |

(Continued)

FOREIGN PATENT DOCUMENTS

EP 0585004 A2 3/1994

(Continued)

OTHER PUBLICATIONS

"VOip Gateways: Bigger and Better", Business Communications Review, vol. 31, No. 9, vol. 56(7) (Sep. 2001).

(Continued)

*Primary Examiner*—Binh K. Tieu
(74) *Attorney, Agent, or Firm*—Mark S. Walker; Amy J. Pattillo

(57) ABSTRACT

A method, computer program product, and program for originating a billed transaction at an origin telephony device are provided. A request to originate a billed transaction is received from an origin device. The identity of a callee answering a call originated by the origin device is authenticated. Responsive to receiving an acceptance of the call by the callee, an account accessed by the authenticated identity of said callee is billed to complete said billed transaction, such that the origin device is enabled to initiate the billed transaction charged to the callee. In particular, a service associated with the billed transaction may only available for a particular callee or selection of callees. In addition, the callee may elect which account to charge for the billed transaction. Further, the identity of the caller originating the call at the origin device is forwarded to the callee.

39 Claims, 6 Drawing Sheets

U.S. PATENT DOCUMENTS

| | | | |
|---|---|---|---|
| 5,790,637 A | 8/1998 | Johnson et al. | 379/67 |
| 5,805,680 A | 9/1998 | Penzias | 379/118 |
| 5,822,411 A | 10/1998 | Swale et al. | 379/114.22 |
| 5,859,900 A * | 1/1999 | Bauer et al. | 379/114.21 |
| 5,870,456 A * | 2/1999 | Rogers | 379/91.01 |
| 5,872,834 A | 2/1999 | Teitelbaum | 379/93.03 |
| 5,915,001 A | 6/1999 | Uppaluru | 379/88.22 |
| 5,937,044 A | 8/1999 | Kim | |
| 5,940,476 A | 8/1999 | Morganstein et al. | 379/88.02 |
| 5,943,405 A | 8/1999 | Morikawa et al. | 379/118 |
| 5,946,654 A | 8/1999 | Newman et al. | 704/246 |
| 5,978,450 A | 11/1999 | McAllister et al. | 379/88.02 |
| 6,038,305 A | 3/2000 | McAllister et al. | 379/207 |
| 6,047,051 A | 4/2000 | Ginzboorg et al. | 379/130 |
| 6,058,364 A | 5/2000 | Goldberg et al. | 704/252 |
| 6,061,436 A * | 5/2000 | Bauer et al. | 379/114.01 |
| 6,101,242 A | 8/2000 | McAllister et al. | 379/88.02 |
| 6,122,357 A | 9/2000 | Farris et al. | 379/207 |
| 6,178,230 B1 | 1/2001 | Borland | 379/67.1 |
| 6,195,419 B1 | 2/2001 | Gilboy | 379/114.19 |
| 6,275,940 B1 * | 8/2001 | Edwards et al. | 713/200 |
| 6,282,274 B1 | 8/2001 | Jain et al. | 379/114.26 |
| 6,324,269 B1 | 11/2001 | Malik | 379/114.23 |
| 6,327,346 B1 | 12/2001 | Infosino | 379/88.02 |
| 6,330,315 B1 | 12/2001 | Kapsales et al. | |
| 6,381,317 B1 | 4/2002 | Bala et al. | 379/114.23 |
| 6,535,596 B1 * | 3/2003 | Frey et al. | 379/201.01 |
| 6,542,590 B1 | 4/2003 | Player et al. | |
| 6,546,238 B1 | 4/2003 | Nightingale et al. | 455/406 |
| 6,603,843 B1 | 8/2003 | Hagemann | 379/111 |
| 6,639,977 B1 * | 10/2003 | Swope et al. | 379/114.21 |
| 6,788,771 B1 * | 9/2004 | Manto | 379/114.05 |
| 6,826,173 B1 | 11/2004 | Kung et al. | |
| RE38,715 E * | 3/2005 | Rogers et al. | 379/91.01 |
| RE38,801 E * | 9/2005 | Rogers | 379/91.01 |
| 6,956,935 B1 * | 10/2005 | Brown et al. | 379/114.21 |
| 6,996,216 B1 * | 2/2006 | Brown et al. | 379/114.01 |
| 2002/0055906 A1 * | 5/2002 | Katz et al. | 705/39 |
| 2002/0099670 A1 | 7/2002 | Jakobsson | |
| 2003/0108158 A1 | 6/2003 | Brown et al. | 379/88.01 |
| 2003/0108159 A1 | 6/2003 | Brown et al. | 379/88.01 |
| 2003/0108160 A1 | 6/2003 | Brown et al. | 379/88.01 |
| 2003/0108161 A1 | 6/2003 | Brown et al. | 379/88.01 |
| 2003/0108163 A1 | 6/2003 | Brown et al. | 379/88.01 |
| 2003/0112935 A1 | 6/2003 | Brown et al. | 379/114.21 |
| 2003/0112936 A1 * | 6/2003 | Brown et al. | 379/121.02 |
| 2003/0112942 A1 * | 6/2003 | Brown et al. | 379/196 |
| 2003/0114142 A1 * | 6/2003 | Brown et al. | 455/408 |
| 2003/0115070 A1 | 6/2003 | Brown et al. | 705/26 |
| 2003/0115138 A1 | 6/2003 | Brown et al. | 705/40 |
| 2005/0238146 A1 * | 10/2005 | Brown et al. | 379/88.01 |
| 2005/0238151 A1 * | 10/2005 | Brown et al. | 379/114.01 |

FOREIGN PATENT DOCUMENTS

| | | |
|---|---|---|
| EP | 0676882 A2 | 10/1995 |
| JP | 8139797 A | 5/1996 |
| JP | 10294784 A | 11/1998 |

OTHER PUBLICATIONS

WPAT Derwent 1994-067503.
WPAT Derwent 1995-346415.
WPAT Derwent 1996-315499.
WPAT Derwent 1999-031530.

* cited by examiner

ORIGINATING A BILLED TRANSACTION FOR AN ORIGIN TELEPHONY DEVICE

CROSS-REFERENCE TO RELATED APPLICATIONS

The present application is related to the following co-pending applications:
(1) U.S. patent application Ser. No. 10/015,381;
(2) U.S. patent application Ser. No. 10/015,281;
(3) U.S. patent application Ser. No. 10/015,265;
(4) U.S. patent application Ser. No. 10/015,267;
(5) U.S. patent application Ser. No. 10/015,282;
(6) U.S. patent application Ser. No. 10/015,280;
(7) U.S. patent application Ser. No. 10/023,408;
(8) U.S. patent application Ser. No. 10/023,407;
(9) U.S. patent application Ser. No. 10/023,404;
(10) U.S. patent application Ser. No. 10/022,611;
(11) U.S. patent application Ser. No. 10/022,159;

BACKGROUND OF THE INVENTION

1. Technical Field

The present invention relates in general to telecommunications and, in particular, to voice identification. Still more particularly, the present invention relates to originating a billed transaction for an origin telephony device.

2. Description of the Related Art

Telephone service has created communication channels worldwide, and those channels continue to expand with the advent of cellular and other wireless services. A person can simply take a telephone off-hook and dial a destination number or press a send button and be connected to a telephone line around the world.

Today, the public switching telephone network (PSTN), wireless networks, and private networks telephone services are based on the identification of the wireless telephone or wireline that a calling party uses. Services are personalized according to wireless telephone or wireline telephone number, where services associated with one telephone number are not accessible for another telephone number assigned to the same subscriber. For example, there is typically a first set of service features and billing options assigned to a home line number, a second set of service features and billing options assigned to an office line number, and a third set of service features and billing options assigned to a cellular telephone number. The networks process calls to and from each of these different subscriber telephones based on a separate telephone number.

One feature of telephone switching systems is the availability of service numbers. Service numbers may be subscribed to by businesses and individuals who are interested in providing a service via the telephone. For example, fortune tellers may subscribe to a service number. Service numbers typically utilize a distinct area code, such as A900" to indicate that additional charges may be incurred if dialed.

When an individual dials a service number, that individual is agreeing for a charge to be applied to the billing plan for the line number from which the call originates. For example, if an individual dials the service number for a fortune teller, the line number from which the individual dialed may be charge for each minute of service.

One problem with service numbers is when children or other unauthorized individuals utilize a line number to call service numbers, racking up charges on a line number account. Another problem with service numbers is that an individual must call the service number for a charge to be added to the line number from which a call originates. A call could be made from the service number, but no charges would incur to the line number at which the call is answered.

Some businesses have found it productive to offer subscriptions to services, such as a daily stock review or news updates. Individuals receive a bill, typically monthly and separate from a telephone service bill, to receive an automated, personalized report via telephone. However, a limitation of such subscription services is that any person answering the line number utilized by the subscription service may listen to the personalized report. Thus, the subscriber will pay for the reports whether the subscriber or another individual listens to the reports. Another limitation of such subscription services is that the subscription service cannot initiate a billed transaction with the subscriber.

Therefore, in view of the foregoing, it would be advantageous to provide a method, system, and program for originating a billed transaction from a device that originates a call, where the device that answers the call is billed. Further, it would be advantageous to detect the identity of the individual answering a call prior to completing a billed transaction. Moreover, it would be advantageous to bill the transaction to the individual actually answering a call, rather than the line number from which the call is answered.

SUMMARY OF THE INVENTION

In view of the foregoing, it is therefore an object of the present invention to provide an improved telecommunications system.

It is another object of the present invention to provide a method, system and program for improved voice identification.

It is yet another object of the present invention to provide a method, system and program for originating a billed transaction for an origin telephony device.

According to one aspect of the present invention, a request to originate a billed transaction is received from an origin device. The identity of a callee answering a call originated by the origin device is authenticated. Responsive to receiving an acceptance of the call by the callee, an account accessed by the authenticated identity of said callee is billed to complete said billed transaction, such that the origin device is enabled to initiate the billed transaction charged to the callee. In particular, a service associated with the billed transaction may only available for a particular callee or selection of callees. In addition, the callee may elect which account to charge for the billed transaction. Further, the identity of the caller originating the call at the origin device is forwarded to the callee.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
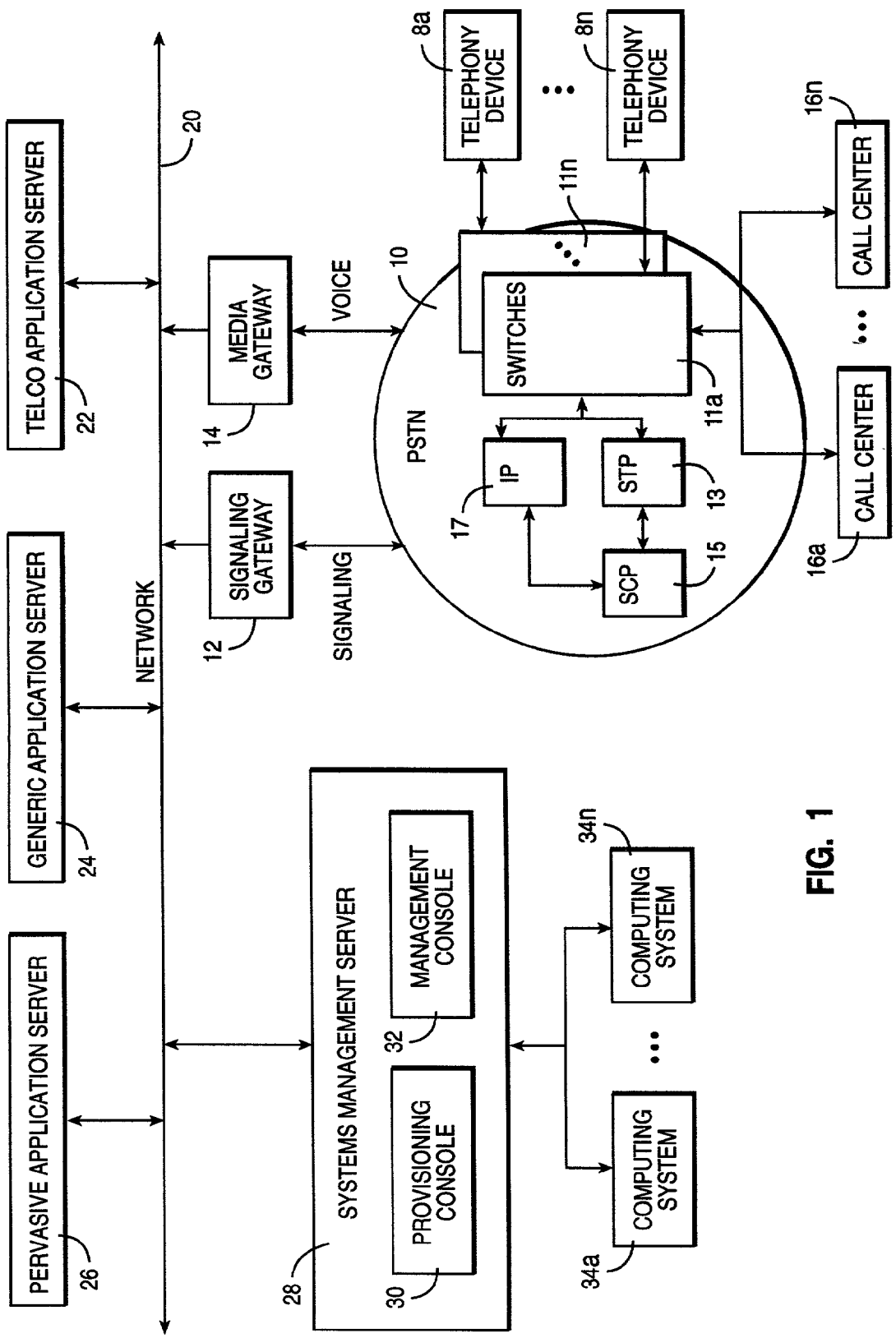
FIG. 1 depicts a block diagram of a network environment in which the present invention may be implemented.

A method, system, and program for initiating billed transactions at an origin device, where a destination device is billed, are provided. For purposes of the present invention, a billed transaction includes a tariff charge that is applied to a callee account for receipt of a service. A tariff charge may include, but is not limited to, a monetary amount, a points amount, electronic coupons, electronic vouchers, and other electronic payments that may be transferred.

First, a caller initiates a call to a callee, where the caller requests the initiation of a billed transaction for a particular service. The caller may indicate the rate and type of service in the initiation request. In addition, the caller may indicate at least one callee identity that is authorized to receive the service.

An intermediary device processing the call requests authentication of the caller utilizing the origin device. Caller identity authentication may be initiated by the origin device originating the call, the intermediary device processing the call, or the destination device receiving the call. Each of the devices may also access a third party or external server to perform the caller identity authentication. Performance of caller identity authentication has different advantages depending on the device initiating the caller identity authentication.

In addition, when a caller profile is loaded for an authenticated caller identity, the caller profile may indicate that a billed transaction should be initiated for the call. For example, the caller profile may specify that any long distance calls for the caller from a business's origin device should initiate a billed transaction to the callee.

The request for initiation of a billed transaction may be transferred to a billed transaction service. The billed transaction service may reside within a trusted telephone network as an Intelligent Peripheral. Alternatively, the billed transaction service may reside outside the trusted telephone network accessible via an external network.

The call is then transferred to a destination device requested by the caller. The individual answering a call will receive the authenticated identity of the caller and a prompting. By receiving the authenticated identity of the caller, the individual receiving the call is more likely to accept a call where charges will be incurred.

The prompting may first require the individual to provide a voice sample or other input utilized to authenticate the callee identity. The callee identity may then be compared with callee identities authorized by the caller to receive a service. In particular, the billed transaction service may perform the determination as to whether a callee is authorized to receive a service. If the callee is authorized to receive a service, then the callee is prompted to accept the service call for a fee. A billing plan for the callee may be accessed according to the callee identity, such that the callee is also provided with options from the billing plan of how to pay for the call. If the callee is not authorized to receive a service, then the callee may be prompted with the names of authorized callees or with directions for signing up for a service.

The caller may also solicit business for a service, without authorized callee identities identified. In this case, the callee is identified and the callee billing plan retrieved, to determine whether the callee is authorized to accept billed transaction services or not. If the callee is authorized to accept billed transaction services, then the callee may be prompted to accept a service being offered. Advantageously, a child is an identifiable callee whose billing plan may block acceptance of billed transactions.

For purposes of the present invention, a caller or callee preferably subscribes to a telephone service from at least one service provider. That service may be linked to a particular line number, but preferably follows the caller or callee to whatever telephone device the caller or callee chooses to utilize. The service may include a billing plan that provides for services in addition to basic telephone service, at a flat rate. In addition, the billing plan may provide for other services, in addition to basic telephone service, that are billable according to use, such as long distance service. Further, the billing plan may indicate billing preferences, such as types of billed transactions to block.

According to another advantage of the present invention, a business may provide a number that a caller may call, where the intermediary device will automatically initiate a billed transaction of a tariff from the callee to the caller. For example, a business may publish a telephone number that callers may call in order to participate in a survey. A billed transaction is initiated by the caller dialing the number and the tariff for completing the survey is transferred at the end of the call.

For purposes of the present invention, telephony devices are termed origin devices when utilized for origination of a call to an intermediary device and are termed destination devices when utilized for receipt of a call from an intermediary device. Subscribers to a call are termed callers when originating a call and are termed callees when receiving a call. Callers and callees may or may not be line subscribers to the particular telephony device utilized.

While in the present invention, authentication of a caller identity is described with emphasis placed on voice authentication, other methods of caller identity authentication may also be performed. Voice samples utilized for voice authentication are just one of multiple types of biometric sampling. For example, a caller may locally provide an eye scan, a fingerprint, and other biophysical identifiers that are transmitted within or outside the trusted network to authenticate the identity of the caller. Alternatively, keypad entries, such as a pin code, account number, password, or other secure transaction key may be entered by a caller and utilized to authenticate the identity of the caller.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

General Network Environment

First, the network environment incorporates a Public Switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service provider's telephone network is considered trusted movement within a trusted network because the call remains within the company's telephone network infrastructure. However, calls may be transferred from one service provider's telephone network to another service provider's telephone network in generally trusted movement. Generally, service providers are in competition with one another and therefore there is general trust in transferring a call, but not trust in sharing of subscriber information beyond a subscriber number and name from one service provider to the next without security features or other arrangements.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service provider's data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via a network 20 is untrusted and therefore may require verification and additional security. Network 20 may be preferably considered an external network.

In the present invention, network 20 may comprise a private network, an Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. PSTN 10 preferably brokers the connection between the telephony device and telco application server 22. Such services may also be provided to calls within PSTN 10, however placing such services at a third party such as telco application server 22, is advantageous because adding services and information to PSTN 10 is time consuming and costly when compared with the time and cost of adding the services through telco application server 22.

In accord with an advantage of the present invention, as will be further described, the identity of both the caller and the callee may be authenticated by one of telephony devices 8a–8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably accesses independent server systems that provide services. For example, a messaging server, a financial server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably accesses the consoles of systems management server 28 via the Internet utilizing a computing system, such as computing systems 34a–34n.

The subscriber profile may be accessed at systems management server 28 by other external servers and PSTN 10 via network 20. In addition, a local copy of a subscriber profile updated in systems management server 28 may be stored within a particular service provider's data network or telephone network. Each service provider may specify the types of preferences and other information included within a subscriber profile.

In particular, a subscriber may provide a voice imprint when establishing a subscriber profile through provisioning console 30. Other types of authentication information may also be provided including, but not limited to, a password, an eye scan, a smart card ID, and other security devices. In addition, a subscriber may designate billing preferences, shopping preferences, buddy list preferences, and other preferences that enable specialized service to the subscriber when the subscriber's identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

Identity Authentication and Call Control

Looking into PSTN 10, a telephone network typically includes multiple switches, such as central office switches 11*a*–11*n*, that originate, terminate, or tandem calls. Central office switches 11*a*–11*n* utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11*a*–11*n* query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP provides record of the privacy service to initiate an announcement to a caller to identify themself to the subscriber with the privacy service who is being called. According to an advantage of the invention, authentication of the subscriber receiving the call may be required before the privacy service is initiated for that subscriber.

In particular, network traffic between signaling points may be routed via a packet switch called an service transfer point (STP) 13. STP 13 routes each incoming message to an outgoing signaling link based on routing information. Further, in particular, the signaling network may utilize an SS7 network implementing SS7 protocol.

Central office switches 11*a*–11*n* may also send voice and signaling messages to intelligent peripherals (IP) 17 via voice trunks and signaling channels. IP 17 provides enhanced announcements, enhanced digit collection, and enhanced speech recognition capabilities.

According to an advantage of the present invention, the identity of a caller is authenticated according to voice authentication. Voice authentication is preferably performed by first identifying a subscriber by matching the name or other identifier spoken with a subscriber name or identifier. Next, voice authentication requires verifying that the voice audio signal matches that of the identified subscriber. However, in alternate embodiments, the identity of a subscriber may be authenticated according to passwords, eye scans, encryption, and other security devices.

In particular, to perform subscriber authentication of audio signals received from callers, IP 17 may include storage for subscriber specific templates or voice feature information, for use in authenticating subscribers based on speech. If a subscriber specific template is not stored on a local IP 17, then a remote IP containing the subscriber specific template may be accessed via a network. In addition, local IP 17 may access systems management server 28 or another repository for voice imprints to access the subscriber specific template.

Where IP 17 authenticates the identity of a caller (e.g. the subscriber placing a call), a voice identifier (VID) representing the authenticated caller identity is transferred as a signal for identifying the caller. In addition, where IP 17 authenticates the identity of a callee (e.g. the subscriber receiving a call), a reverse VID (RVID) including the callee identity is transferred as a signal for identifying the callee.

Alternatively, to perform subscriber authentication of audio signals received from callers, PSTN 10 may broker a caller identity authentication service from telco application server 22. In particular, a signaling channel is opened between central office switches 11*a*–11*n* and telco application server 22 via signaling gateway 12. In addition, a voice channel is opened between central office switches 11*a*–11*n* and telco application server 22 via media gateway 14.

Because telco application server 22 is located outside of the trusted network, there may be a time delay associated with establishing a connection to telco application server 22 and authenticating the identity of a caller that is longer than a time delay present where a caller identity is authenticated by IP 17.

In addition, because telco application server 22 is located outside of the trusted network, it is advantageous to establish a level of security for transactions between telco application server 22 and central office switches 11*a*–11*n*, wherein the level of security is suitable for untrusted communications. A level of security may be implemented by by utilizing security based protocols, such as the secure socket layer, and by applying ordinary encryption. In particular, the level of security preferably protects the communication channel between telco application server and PSTN 10 and authenticates the identity of the server from which a caller identity authentication service is accessed. Therefore an additional feature of signaling gateway 12 and media gateway 14 is security verification.

Advantageously, VIDs indicate through text, voice, or video the identity of a caller. For example, a caller's name may be transferred as the identity of a caller. Alternatively, a video clip stored with the subscriber template may be transferred as the identity of a caller. Additionally, VIDs may indicate the identity of the device utilized by a caller to provide context for a call. Further, VIDs may indicate which system or systems have authenticated the caller identity.

After a VID and/or RVID are determined by IP 17, IP 17 and SCP 15 may communicate to designate which services are available according to VID and RVID. Advantageously, by designating services according to a VID and/or RVID, subscribers are provided with services and billed for those services independent of the devices utilized by subscribers. In particular, a 1129 protocol or other protocol may be utilized to enable signal communications between IP 17 and SCPs 15.

In addition, as previously described, caller authentication to determine VIDs and RVIDs may be performed by an external system, such as telco application server 22. The VID or RVID returned from telco application server 22 may be transferred from central office switches 11a–11n to SCP 15 in order to access a subscriber profile associated with the VID or RVID. Alternatively, the VID or RVID may first transfer to IP 17, where additional verification of the caller identity is performed. For example, IP 17 may control distribution of the VID to the caller, where the caller is prompted to enter a password or additional information. IP 17 may then initiate loading the caller profile into central office switches 11a–11n if the additional caller input is verifiable for the VID.

An origin telephony device or destination telephony device may also determine a VID and/or RVID for the caller and/or callee of a call. In particular, telephony devices 8a–8n and call centers 16a–16n may function as origin and destination telephony devices. Each of the telephony devices may include a database of voice templates that may be matched to authenticate the identity of a caller or callee. In addition, each of the telephony devices may access a third party, such as telco application server 22, to authenticate the identity of the caller or callee. In either case, the telephony device transmits a VID and/or RVID with a call to PSTN 10.

Telephony devices 8a–8n may include, but are not limited to wireline devices, wireless devices, pervasive device equipped with telephony features, a network computer, a facsimile, a modem, and other devices enabled for network communication. Advantageously, as previously described, a voice authentication functioning device may be included in each of telephony devices 8a–8n.

In addition, telephony devices 8a–8n may each incorporate a display that provides a visual output of a VID or RVID. Alternatively, such a display may be provided in a separate device connected to the line in parallel to telephones 8a–8n. According to one advantage of the present invention, the identity of the actual caller or actual callee are output to a display in association with a call. In addition, other context information about the caller including, but not limited to, the device from which the call originates or is answered, ratings for a caller or callee, and other context information may be output to a display in association with a call.

Telephony devices 8a–8n are communicatively connected to PSTN 10 via wireline, wireless, ISDN, and other communication links. Preferably, connections to telephony devices 8a–8n provide digital transport for two-way voice grade type telephone communications and a channel transporting signaling data messages in both directions between telephony devices 8a–8n and PSTN 10.

In addition to telephony devices 8a–8n, advanced telephone systems, such as call centers 16a–16n, may be communicatively connected to PSTN 10 via wireline, wireless, ISDN and other communication links. Call centers 16a–16n may include PBX systems, hold queue systems, private network systems, and other systems that are implemented to handle distribution of calls to multiple representatives or agents.

Returning to central office switches 11a–11n, typically, one central office switch exists for each exchange or area served by the NXX digits of an NXX-XXXX (seven digit) telephone number or the three digits following the area code digits (NPA) in a ten-digit telephone number. The service provider owning a central office switch also assigns a telephone number to each line connected to each of central office switches 11a–11n. The assigned telephone number includes the area code (NPA) and exchange code (NXX) for the serving central office and four unique digits (XXXX).

Central office switches 11a–11n utilize office equipment (OE) numbers to identify specific equipment, such as physical links or circuit connections. For example, a subscriber's line might terminate on a pair of terminals on the main distribution frame of one of central office switches 11a–11n. The switch identifies the terminals, and therefore a particular line, by an OE number assigned to that terminal pair. For a variety of reasons, a service provider may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called party's station or line. The switch terminating a call to a destination will also utilize profile information relating to the destination, for example to forward the call if appropriate, to apply distinctive ringing, etc.

In the present invention, multiple factors may cause a billed transaction service to be initiated in association with a call. A billed transaction service may be provided by IP 17 or by telco application server 22, for example. The billed transaction service preferably initiates a billed transaction that will charge a callee a tariff for access to the caller or a service provided by the caller.

In the present invention, a VID for the caller is preferably determined, for example, by IP 17 or telco application server 22. A caller profile for the VID may be accessed and loaded into one of central office switches 11a–11n. In particular, a caller profile may indicate certain types of services that, when requested by the caller, should initiate a billed transaction service.

In addition, in the present invention, one of central office switches 11a–11n looks up the dialed telephone number with SCP 15 to determine a destination service provider for the call. Some telephone numbers stored within SCP 15 indicate that the billed transaction service should be initiated when the telephone number is dialed.

Further, in the present invention, the dialed digits by the caller preferably indicate that the caller wants to initiate a billed transaction. For example, the dialed digits may start with A679@ or another recognized set of numbers to initiate a billed transaction. In particular, for example, a A976@ code may allow a destination device to initiate a billed transaction service. Here, a A679@ code allows an origin device to initiate a billed transaction service. The caller may indicate the rate for the billed transaction and select an account to be credited if the call is answered.

Alternatively, the caller may present a voice request or other input to initiate a billed transaction. Central office switches 11a–11n receiving a billed transaction initiation may then transfer the call to a billed transaction service, within IP 17 or telco application server 22.

Next, a RVID for the callee is preferably determined. A callee profile according to the RVID may be accessed from SCP 15 or an external data storage system. The callee profile preferably includes a billing plan provided such that the callee may be charged a tariff for receiving a call. If the billed transaction indicates that there is a selection of authorized receivers, then the RVID is compared with this selection; billing, as well as the service, is only provided if the callee is authorized. If the billed transaction does not indicate a selection of authorized receivers, then the callee may be prompted by the billed transaction service with the tariff required for accepting the call.

If the caller accepts the tariff conditions of the billed transaction, then the billed transaction service establishes the transaction. Next, the call is processed from central office switches 11a–11n.

VID Authentication Context

Figure 2:
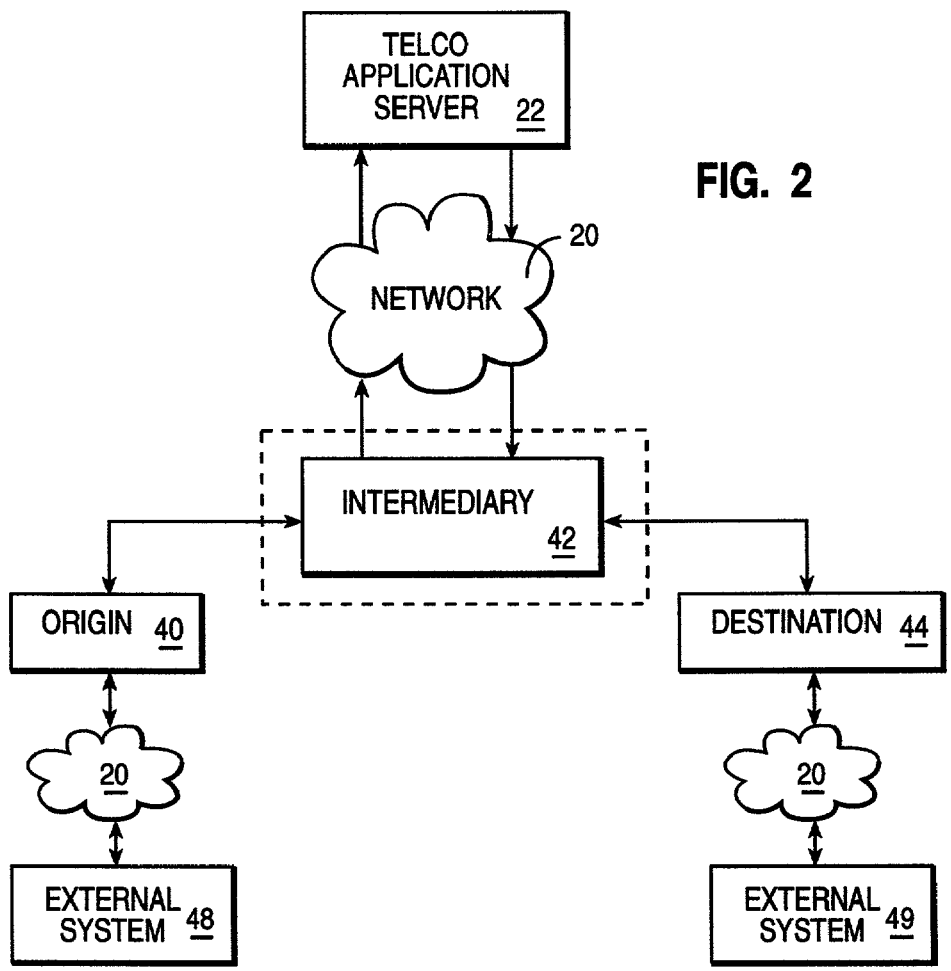
FIG. 2 illustrates a block diagram of the flow of a caller and callee identity authentication in accordance with the method, system, and program of the present invention.

Referring now to FIG. 2, there is illustrated a block diagram of the flow of a caller and callee identity authentication in accordance with the method, system, and program of the present invention.

Origin device 40 is utilized by a caller to initiate a call. The caller is prompted by the device performing caller authentication to provide a voice utterance. A VID for the caller is provided to intermediary device 42 from the device performing caller authentication. The VID is utilized to access a caller profile that includes service preferences and billing information. In addition, the VID is transmitted with the call to destination device 44 for identifying the caller.

In general, caller identity authentication is performed by receiving a voice utterance from a caller, analyzing the voice utterance for sound qualities and content, and attempting to match the sound qualities and content of a voice utterance to a voice template previously recorded for a caller, in order to authenticate the identity of the caller. If there is a match between the voice utterance and a voice template, then a VID is determined for the caller and utilized to authenticate the caller identity for retrieving a caller profile and billing the caller.

In the present invention, the caller may be an individual or a business. In the case of an individual, voice authentication is preferable. However, in the case of a business, where origin device 40 is a private switching system that manages multiple telephony devices, it may be more advantageous for the business to provide a numerical identifier and password or other identification. However, the identity of the actual callers for the business may still be identified by voice authentication. In addition, the private switching system may output a prerecorded voice utterance which may be utilized for VID authentication.

Caller identity authentication may be initiated by origin device 40. In particular, origin device 40 may include voice templates and a feature for performing the caller identity authentication. In addition, origin device 40 may access a third party server 48 via network 20, where third party server 48 may provide access to a database of voice templates and/or perform the caller identity authentication. Origin device 40 then transmits a VID determined for the caller to intermediary device 42 for use in specifying services and billing for a call from origin device 40. Origin device 40 may include a caller telephony device, a PBX, a call center, a private switching system, network servers, feature servers, and other systems which provide call origination. Third party server 48 may include a telco application server, a generic application server, a database management system server, and other systems that function outside trusted telephone network 46. In particular, intermediary device 42 may facilitate communication between origin device 40 and network 20.

In addition, caller identity authentication may be initiated by intermediary device 42. Intermediary device 42 may include database systems that store voice templates and an IP for performing caller identity authentication. In addition, intermediary device 42 may access telco application server 22 outside of trusted telephone network 46 via network 20, where telco application server 22 provides a caller authentication service and/or provides access to a database of voice templates. Intermediary device 42 may include a PSTN switching network or networks. However, intermediary device 42 may also include a PBX, a call center, or other private switching system. Further, intermediary device 42 may include network servers, Websphere® (Websphere® is a registered trademark of International Business Machines Corporation) servers, and other systems which provide call processing.

Further, caller identity authentication may be initiated by destination device 44. Destination device 44 may include voice templates and a feature for performing the caller identity authentication. In addition, destination device 44 may access a third party server 49 via network 20, where third party server 49 may provide access to a database of voice templates and/or perform the caller identity authentication. Destination device 44 will prompt a caller to provide a voice utterance at origin device 40, where intermediary device 42 facilitates communications between origin device 40 and destination device 44. Destination device 44 then determines and transmits a VID for the caller to intermediary device 42 for use in specifying services and billing for a call from origin device 40. Destination device 44 may include a callee telephony device, a PBX, a call center, a private switching system, network servers, feature servers, and other systems which provide call receipt. Third party server 48 may include a telco application server, a generic application server, a database management system server, and other systems that function outside trusted telephone network 46. In particular, intermediary device 42 may also facilitate communication between destination device 44 and network 20.

Destination device 44 is utilized by a callee to receive a call. The callee is prompted by the device performing callee authentication to provide a voice utterance. A RVID for the callee is provided to intermediary device 42 from the device performing callee authentication. The RVID is utilized to access a callee profile that includes service preferences and billing information. In addition, the RVID is transmitted to origin device 40 for identifying the callee. Advantageously, callee identity authentication may be initiated by origin device 40, intermediary device 42, or destination device 44, in a similar process as described for caller identity authentication.

In the present invention, a VID and RVID preferably authenticate the identity of a caller and callee. However, it is advantageous that the VID/RVID also include other information that provides a context for a call. For example, the GPS location or time zone of the caller or callee location, the device from which the call is placed or received, the subject matter of the call, and whether the caller is calling on behalf of another, may be included in a VID or RVID. Further, the identity of the device that performed the identity authentication may be included in a VID or RVID.

Figure 3:
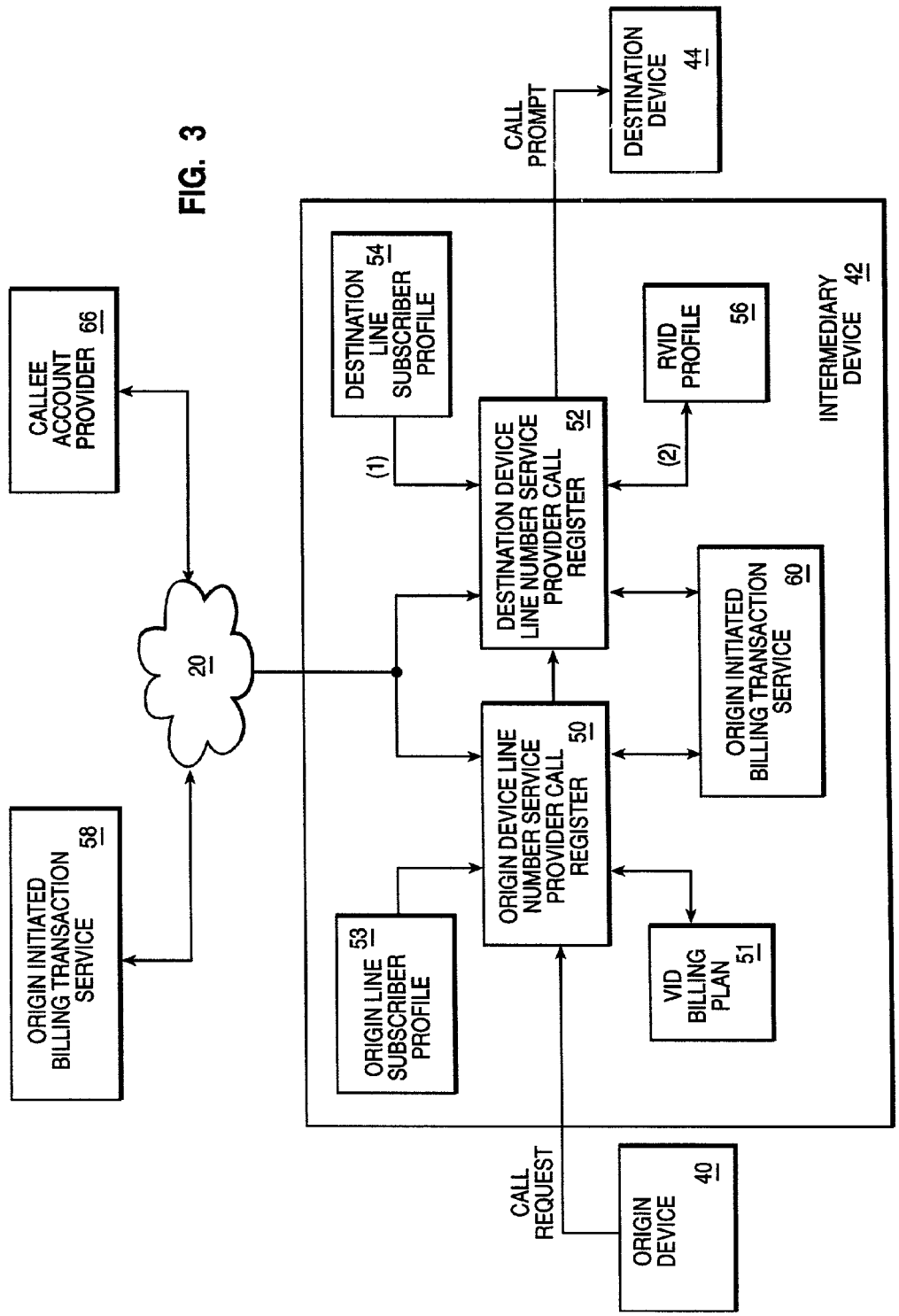
FIG. 3 depicts a block diagram of the flow of billing plans in accordance with the method, system, and program of the present invention.

A VID/RVID may be transferred in multiple protocols, including, but not limited to, Interface Definition Language (IDL). A VID/RVID may include a range of information, where each type of information may be tagged or identified in some other manner. For example, the following tagged VID may be transmitted to represent an authenticated identity of a caller:

[name] Jon Smith
[device] Jane Doe's cell phone
[service provider] Jon's wireless provider G
[account provider] Credit account provider C
[location] Central Time zone
[subject] Project A
[authenticated by] Jane Doe's cell phone, service provider G Caller Billing Context With reference now to FIG. 3, there is depicted a block diagram of the flow of a billing plan in accordance with the method, system, and program of the present invention. As illustrated, origin device 40 transfers a call request to intermediary device 42. The call request may be an off-hook condition for a wireline device and a network service connection request for a wireless device.

Initially, intermediary device 42 will respond to a call request by establishing a call register 50 for the call. In particular, a service provider that provides a line number accessed by origin device 40 will establish call register 50.

Next, intermediary device 42 will respond by accessing the line subscriber profile 53 for the subscriber line associated with origin device 40. A dial tone is then extended for the call. In the present invention, in addition to receiving dialed digits indicating a destination line number, a caller also provides input indicating the initiation of a billed transaction and the type of billed transaction.

One a VID is determined for the caller utilizing origin device 40, then a VID profile 51 may be loaded into call register 50. VID profile 51 preferably includes billed transaction initiation conditions and a billing plan for the caller.

One method for initiating a billed transaction is by a VID profile. A VID profile may indicate that when the caller utilizes a particular device to request a particular service, then a billed transaction to bill the callee a tariff for answering the call, should be initiated.

Another method for initiating a billed transaction is by dialing a first billed transaction initiation number that starts with A679@ or another recognized number sequence for the (NPA) portion of a number. Next, the (NXX) section may represent a type of service. For example A111@ may represent a stock related service, while A333@ represents a fortune telling service. Further, the (XXXX) section may represent the rate for the service. Alternatively, a caller may provide a voice initiation or other input that triggers initiation of a billed transaction service.

Further, another method for initiating a billed transaction is by a consumer as a caller dialing a telephone number that has been predetermined to initiate a billed transaction when dialed. Therefore, a consumer may initiate a billed transaction to a business, as well as a business initiating a billed transaction to a consumer.

In the example, a billed transaction service 60 may reside within trusted telephone network 46, such as an IP that performs the billed transaction service. Further, a billed transaction service 58 may reside outside trusted telephone network 46, such as at the telco application server accessible via network 20. Moreover, although not depicted, a billed transaction service may reside within destination device 44, such that destination device 44 is prompted to handle a billed transaction call.

The billed transaction service may interface with origin device 40 to prompt the caller to provide more information about the billed transaction and the service to be provided. Origin device 40 may utilize an automated system to reply to the prompts from the billed transaction service.

In processing the call, intermediary device 42 will look up the service provider assigned to the destination line number provided by the caller and transfer the call to the next service provider if needed. The service provider assigned to the destination line number may or may not be be the same as the service provider assigned to the origin line number.

A call register 52 is established to terminate the call to destination device 44. In particular, a destination line subscriber profile 54 is loaded into call register 52 in association with the destination line number. Destination line subscriber profile 54 preferably includes a billing plan for the line subscriber. However, once an RVID is received for the callee at destination device 44, a RVID profile 56 for the RVID is accessed and loaded into call register 52. The services and billing plan for the callee are available for processing the call. While call register 50 and call register 52 are depicted as independent registers, in alternate embodiments, the call registers may be consolidated into a single unit.

RVID profile 56 may be accessed from a RVID based callee profile stored within a database accessible within trusted telephone network 46. In addition, RVID profile 56 may be accessed from servers external to trusted telephone network 46. In particular, a callee may choose to disclose billing information at multiple locations external to trusted telephone network 46. In addition, a callee may choose to change billing information at systems management server 28 and other servers external to trusted telephone network 46. For example, a callee may access management console 32 within systems management server 28 to update service and billing preferences according to RVID. Intermediary device 42 may then access systems management server 28 to obtain billing information according to RVID.

Next, the billed transaction service will determine whether the callee can accept this type of billed transaction. A callee profile may block acceptable of all origin device initiated billed transactions, or a selection of categories of origin device initiated billed transactions. If the callee is blocked from accepting, then the callee may be prompted to find an individual who is able to accept the billed transaction. If the callee is not blocked from accepting, then the callee is prompted to select a method of payment and the payment amount.

In addition, a caller may specify a selection of authorized recipients for the call. The billed transaction service will determine whether the RVID matches the selection of authorized recipients. If the RVID does not match, then the callee may be prompted with the names of the selection of authorized recipients. If the RVID does match, then the callee is prompted to select a method of payment and the payment amount.

In particular, before a callee can accept an origin device initiated billed transaction, the callee should be informed of the nature of the call and given options for accepting the tariff charges to a particular billing location. Once the callee elects to accept the tariff charges and indicates an account where the tariff charges should be billed, then the billed transaction service controls billing the callee at the location selected by the callee. In particular, the billed transaction service will transmit charges according to RVID to, for example, an automatic debit account, a charge account, a telephone service account, or other locations selected by the callee to complete the billed transaction. For example, a callee account provider 66 may be accessible outside trusted telephone network 46 for charging a tariff according to RVID. An advantage of callee account provider 66 is that accounts are stored according to RVID, such that the callee is not required to reveal account numbers for the caller to bill callee account provider 66.

The billed transaction service preferably provides an indicator to the origin device when billing is secured for the call. Origin device 40 may then provide a service via telephone. Alternatively, the service may include shipping a particular product or other services, where the callee accepts the product or service by accepting the call. Further, in the case of a caller being provided a telephone number than initiates a billed transaction to a particular company, the billed transaction is not completed, that is the tariff is not transferred to the caller, until the caller has completed the survey or other service required for the call.

Figure 4:
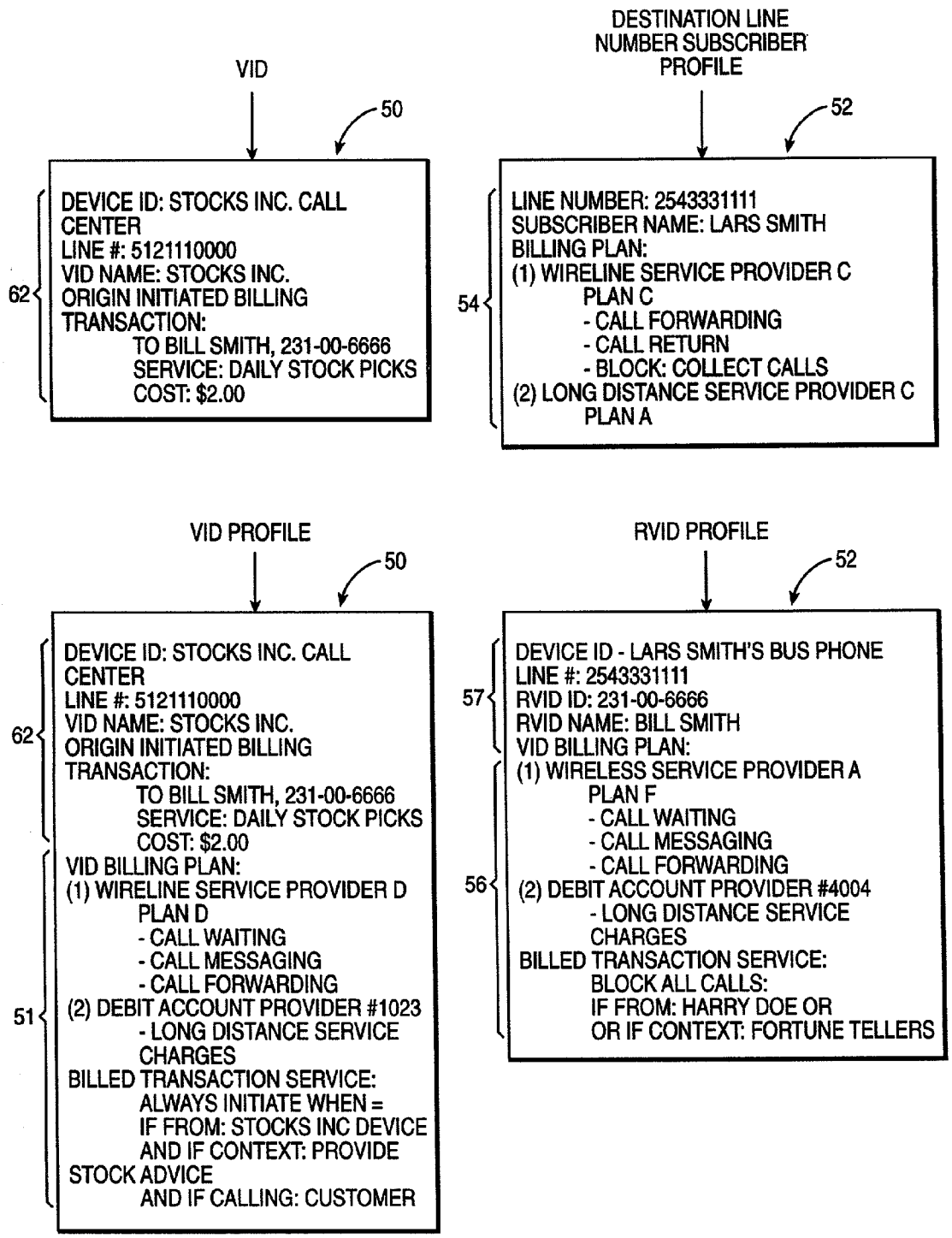
FIG. 4 illustrates an illustrative representation of the information within billing plans in accordance with the method, system, and program of the present invention.

Referring now to FIG. 4, there is an illustrative representation of the information within billing plans in accordance with the method, system, and program of the present invention.

In the example, a VID 62 is determined for the caller at the origin device. VID 62 indicates the identification of the origin device, the line number, the name of the caller, and the origin device initiated billed transaction requested by the caller. In particular, VID 62 may be compiled by the intermediary device over a series of interactions with the caller. For example, initially, only the identity of the caller is determined. Next, the specifics for the origin initiated billed transaction are added.

Advantageously, a VID profile 51 may be requested such that the billed transaction service may access a billing plan for the caller. Advantageously, the caller may select which account will receive the credit of $2.00, if paid by the callee. If a service provider is selected, then the credit is added to the caller's telephone service account by the billed transaction service when the billed transaction is completed. If the charge account is selected then the credit is added to the charge account automatically by the billed transaction service when the billed transaction is completed.

In the example, the origin initiated billed transaction specifies the identity of the callee authorized to accept the daily stock picks service. The line subscriber of the destination device, as indicated in line subscriber profile 54, is not an authorized callee. However, after an RVID 57 is determined for the actual callee answering a call at the destination device, RVID 57 indicates that the callee is ABill Smith@ with ID A231-00-6666@. In alternate embodiments, a selection of authorized recipients may not be specified.

In addition, VID profile 51 indicates conditions for initiating a billed transaction service, independent of the current billed transaction specifically requested by the caller. In the example, if the caller is utilizing a telephone device subscribed to by AStocks Inc.@, the callee is included in a customer list, and the context of the call is providing stock related advice, then the caller has selected for a billed transaction for the call to be initiated.

RVID profile 56 indicates that the callee's billing plan includes a service provider account and an automatic debit account. The callee is preferably provided with the option to select one of the accounts to receive charges of $2.00. In particular, where a service provider account is selected, the service provider preferably adds a charge onto the callee's account according to RVID, such that the callee is later billed for the call. Where an automatic debit account is selected, the account is automatically debited according to RVID, such that the callee is automatically charged for the call. Other types of accounts may also be available to a callee.

RVID profile 56 may also indicate preferences relating to billed transaction service calls. For example, a callee may select a list of callers from which a billed transaction service call may be received, such that all others are blocked. Further, a callee may select a context billed transaction service calls to allow and to block. Moreover, other types of preferences relating to allowing and blocking billed transaction service calls may be designated.

The billed transaction service advantageously accesses the callee's selected account to debit an amount according to the callee's RVID and then accesses the caller's account to credit the amount according to the caller's VID. In particular, the billed transaction service may access VID and RVID profile information to prompt callers and callees with billing options.

According to an advantage of the present invention, a caller may originate a billed transaction. According to another advantage of the present invention, the callee may view the identity of the caller prior to accepting charges for a service from the caller. Further, the callee is identified in order to ensure that a subscription service is only delivered to the authorized recipient and not to anyone else who might happen to pickup a destination line.

Figure 5A:
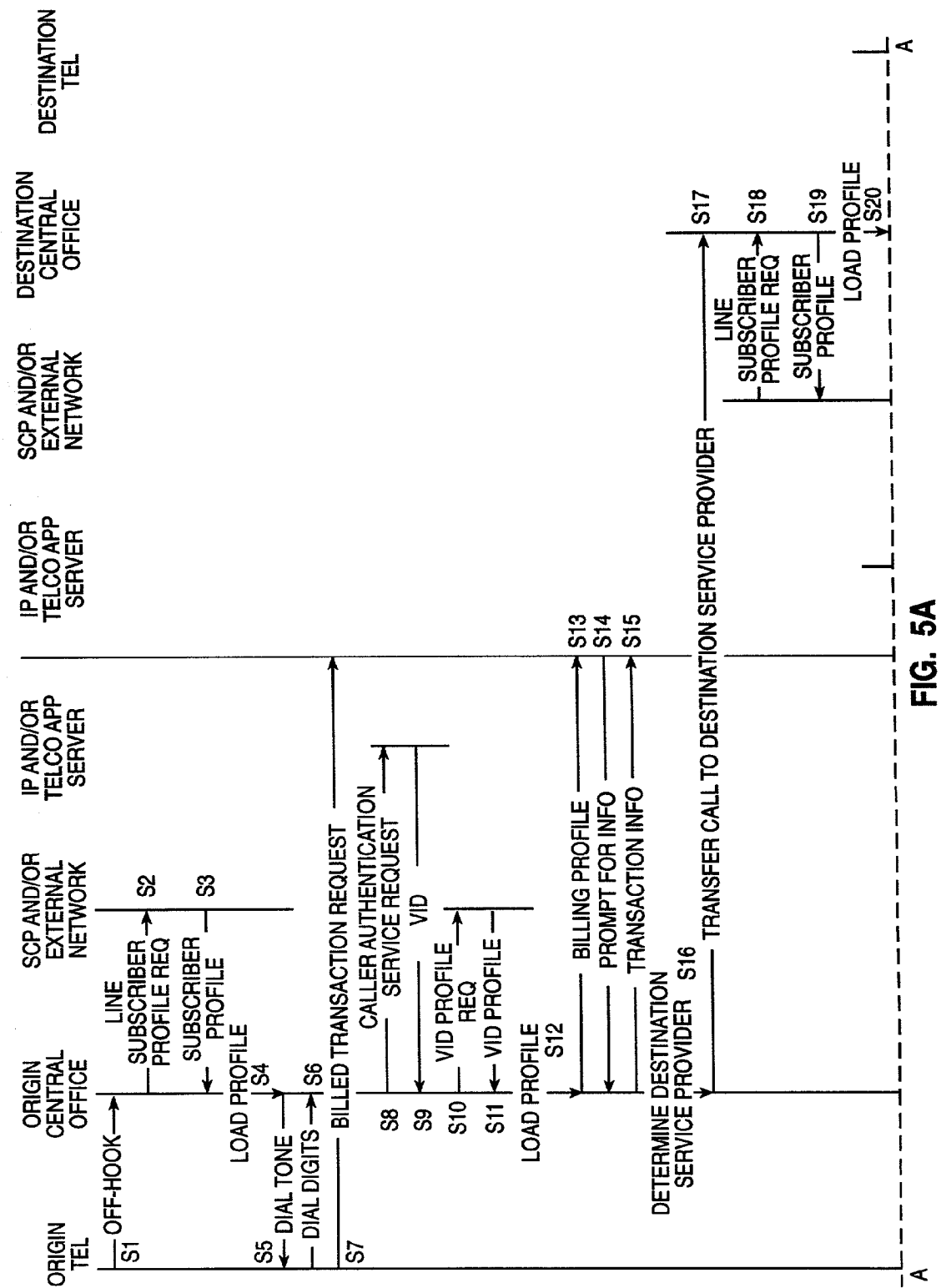
FIG. 5 depicts a flow diagram of a signal flow and processing of a call in accordance with the method, system, and program of the present invention.
Figure 5B:
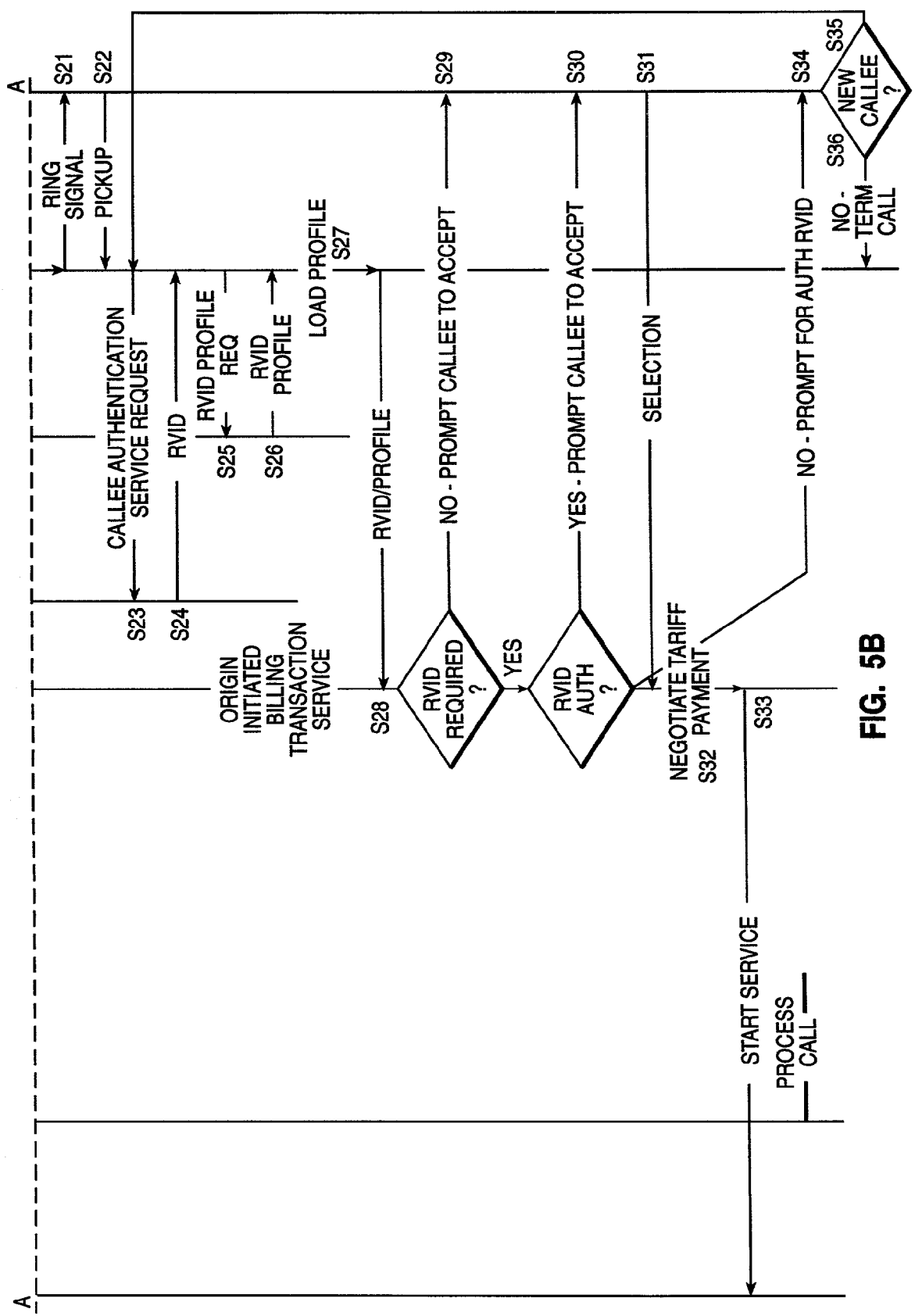

With reference now to FIG. 5, there is depicted a flow diagram of a signal flow and processing of a call in accordance with the method, system, and program of the present invention. A standard telephone device is assumed for the Atel@ origin device in the present example. However, a similar signal flow may be applied to other types of origin devices.

The caller lifts a handset creating an off-hook state in the origin device and a corresponding change in state of an off-hook signal to the origin central office (step S1). In response to detecting an off-hook state in the origin device, the origin central office establishes a register for the call and requests a line subscriber profile from the SCP and/or an external network server (step S2). A line subscriber profile including preferred services and a billing plan is returned to the origin central office (step S3). The central office loads the line subscriber profile into the call register (step S4) and extends a dial tone to the origin device (step S5).

The origin device then transmits dialed digits to the origin central office (step S6). A caller may utilize a keypad to enter a telephone number or utilize a voice dial feature if available. Dialed digits may be received at other points in the process and loaded into the call register until needed for processing the call. In addition, the caller inputs a billed transaction request (step S7) that triggers an origin initiated transaction billed service.

Next, the origin central office extends a caller authentication service request to an IP or to the telco application server (step S8). The caller authentication server will prompt a caller to provide a voice utterance, match the voice utterance with a voice template and authenticate the caller identity as a VID which is returned to the central office (step S9). Alternatively, the origin device or destination device may perform caller authentication, where the VID is received from the origin device or destination device.

The origin central office updates the call register with the VID and extends a request for a VID based profile to the SCP and/or external network servers (step S10). The VID based profile is returned from locations where the caller has selected to make VID based information available (step S11). The origin central office then loads the VID based profile, including service preferences and billing information, into the call register (step S12). In particular, if a service provider indicated in a caller billing plan is different than the service provider providing the line, then the call may be transferred to the service provider indicated in the caller billing plan, where a new call register is created in the central office of the caller billing service provider.

Next, the billing profile for the VID is transferred to the origin initiated transaction billed service (step S13). The origin initiated transaction billed service returns prompting instructions to the origin device to provide additional information about the service, the cost of the service, and an account election for crediting charges made to callees for the service (step S14). The caller may respond with voice inputs and keypad inputs to provide information requested by the origin initiated transaction billed service (step S15). In particular, a caller may register a particular service with the origin initiated transaction billed service or at another location, such that when the caller VID is received, the profile for the registered service is accessed according to the VID. For example, the stocks company that reports daily stock picks a telephone service may establish a service profile that is accessed, such that the stocks company does not have to reenter information and account elections for each billed transaction.

Next, the origin central office determines the service provider for the destination line number (step S16). The destination line number service provider may be different or the same as the origin line number service provider. The call is transferred to the central office of the destination service provider (step S17).

The destination central office establishes a call register for the call and triggers a request to the SCP or an external network server for a line subscriber profile for the destination line number (step S18). The line subscriber profile is returned, including billing information and service preferences (step S19). The destination central office loads the destination line subscriber profile into the call register (step S20) and extends a ring signal with the call to the destination device (step S21).

In response to detecting a pickup of the destination device, an off-hook pickup signal is returned from the destination device to the destination central office (step S22). Next, the destination central office extends a callee authentication service request to an IP or to the telco application server (step S23). The callee authentication server will prompt a callee to provide a voice utterance, match the voice utterance with a voice template and authenticate the callee identity as a RVID which is returned to the destination central office (step S24). Alternatively, the origin device or destination device may perform caller authentication, where the RVID is received at the destination central office from the origin device or destination device.

The destination central office updates the call register with the RVID and extends a request for a RVID based profile to the SCP and/or external network servers (step S25). The RVID based profile is returned from locations where the caller has selected to make RVID based information available (step S26). The destination central office then loads the RVID based profile, including service preferences and billing information, into the call register (step S27).

The RVID and RVID profile, including billing plan, are transferred to the origin initiated billed transaction service (step S28). The service determines whether a selection of RVIDs have been identified for the call. If a selection of RVIDs have not been identified for the call, then the callee is prompted to answer the call and accept charges or hang up (step S29). If a selection of RVIDs have been identified for the call, then a determination is made as to whether the RVID of the callee matches one of the selection of RVIDS. If there is a match, then the callee is prompted to answer the call and accept charges or hang up (step S30). An election by the callee to accept charges to a particular account is returned to the origin initiated billed transaction service (step S31). Alternatively, the callee may hang up the phone, terminating the call.

If a selection is made, the origin initiated billed transaction service then negotiates with the callee billing account holder and the caller billing account holder to debit the callee account and credit the caller account (step S32). Then, the origin initiated billed transaction service prompts the origin device to begin providing the billed service (step S33).

Alternatively, if the VID does not match of the selection of RVIDs, then the callee is prompted with the names included in the selection of RVIDs (step S34). If a new callee is then detected, a callee authentication request is extended (step S35). Alternatively, the callee may hang up the phone, terminating the call (step S36).

Figure 6:
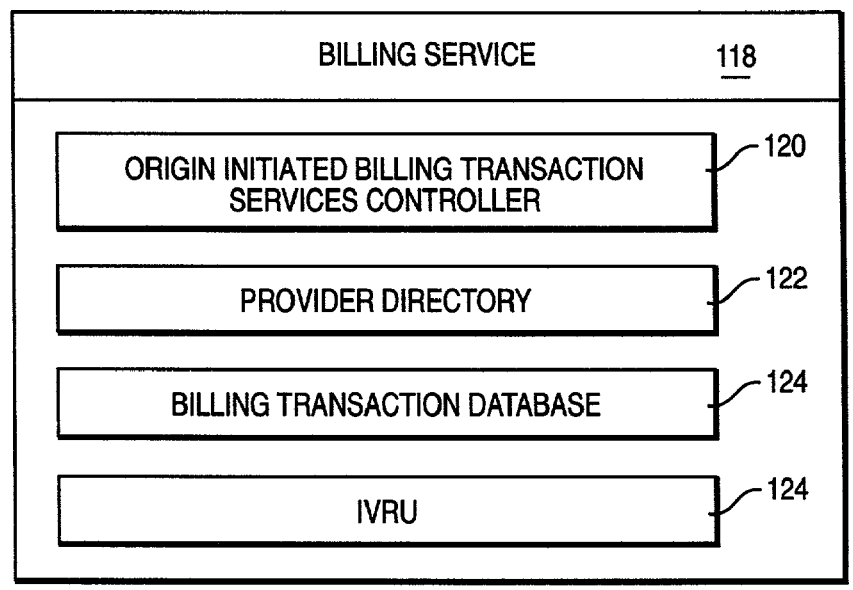
FIG. 6 illustrated a block diagram of a billing service in accordance with the method, system, and program of the present invention.

Referring now to FIG. 6, there is depicted a block diagram of a billing service in accordance with the method, system, and program of the present invention. As illustrated, a billing service 118 includes an origin initiated billing transaction service controller 120. Controller 120 preferably facilitates creating an origin initiated billing request, prompting the callee with the billing request, and facilitating payment of the billing transaction from the callee to the caller.

A provider directory 122 preferably includes network addresses of account and service providers to enable controller 120 to facilitate billing to account and service providers. In addition, provider directory 122 may include ratings for account and service providers according to reliability in previous financial transactions.

A billing transaction database 124 preferably records origin initiated billing transactions facilitated by controller 120. The payment number, payment providers, payment destination and other information related to the transaction may be stored. In particular, records may be stored according to VID or RVID for reference in future transactions.

An interactive voice response unit 126 may prompt the caller to create a billed transaction and may prompt the callee to accept a billed transaction. In addition or alternatively, text messaging may be utilized, where text messages are displayable at the origin and destination device. Further, prompting may be provided in the form of a selectable form in HTML or other network supported languages, transmitted to the origin or destination device.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for billing for services provided by a caller originating a call, said method comprising:
   receiving a request to originate a billed transaction for a service provided by a caller from an origin device;
   authenticating an identity of a callee answering a call originated by said origin device; and
   responsive to receiving an acceptance of said call by said callee from a destination device, billing an account accessed by said authenticated identity of said callee for a cost of said service and crediting said cost to a caller account to complete said billed transaction when said service provided by said caller is complete, such that said origin device is enabled to initiate said billed transaction charged to said callee for said service provided by said caller to said callee during said call.

2. The method for billing for services according to claim 1, further comprising:
   only prompting said caller to provide said service if said callee is one of a plurality of callees authorized to accept said billed transaction for said service.

3. The method for billing for services according to claim 1, further comprising:
   responsive to receiving said request to originate said billed transaction at a switch within a trusted telephone network providing a telephone service connection for said call, establishing a secure communication channel between a billing service provider outside said trusted telephone network and said trusted telephone network, wherein said billing service provider controls authenticating said identity of said callee answering said call, prompting said callee to accept said call with said service, accessing said account by said authenticated identity of said callee, and controlling billing said account accessed by said authenticated identity of said callee for said cost of said service and crediting said cost to said caller account to complete said billed transaction.

4. The method for billing for telephone according to claim 1, further comprising:
   prompting said callee to accept said call and incur a charge for said cost indicated in said billed transaction; and
   only completing said billed transaction if said callee accepts said call.

5. The method for billing for services according to claim 1, wherein receiving a request to originate a billed transaction for a service provided by a caller from an origin device further comprises:
   receiving said request in which said caller specifies said cost for said service and a type of said service.

6. The method for billing for services according to claim 1, further comprising:
   authenticating an identity of said caller utilizing said origin device; and
   providing said callee with said identity of said caller.

7. The method for billing for services according to claim 1, wherein authenticating an identity of said callee further comprises:
   authenticating said identity of said callee according to a voice utterance by said callee.

8. The method for billing for services according to claim 1, wherein receiving a request further comprises:
   receiving a dialed digit request to originate said billed transaction for said caller at said origin device.

9. The method for billing for services according to claim 1, wherein receiving a request further comprises:
   receiving a voice directed request to originate said billed transaction for said caller at said origin device.

10. The method for billing for services according to claim 1, wherein receiving a request further comprises:
    receiving a destination line number that is specified to originate said billed transaction for said caller.

11. The method for billing for services according to claim 1, wherein receiving a request further comprises:
    accessing a profile for said caller; and
    receiving a profile specified request to originate said billed transaction for said caller at said origin device.

12. The method for billing for services according to claim 1, further comprising:
    prompting said caller at said origin device to select said caller account for crediting a cost of said billed transaction.

13. A system for billing for services provided by a caller originating a call, said system comprising:
    a billing controller communicatively connected to a telephone network;
    means for receiving a request to originate a billed transaction for a service provided by a caller at said billing controller from an origin device;
    means for authenticating an identity of a callee answering a call originated by said origin device; and
    means responsive to receiving an acceptance of said call by said callee from a destination device, for billing an account accessed by said authenticated identity of said callee for a cost of said service and crediting said cost to a caller account to complete said billed transaction initiated by said origin device when said service provided by said caller is complete.

14. The system for billing for services according to claim 13, further comprising:
    means for only prompting said caller to provide said service if said callee is one of a plurality of callees authorized to accept said billed transaction for said service.

15. The system for billing for services according to claim 13, further comprising:
    means, responsive to receiving said request to originate said billed transaction at a switch within a trusted telephone network providing a telephone service connection for said call, for establishing a secure communication channel between a billing service provider outside said trusted telephone network and said trusted telephone network, wherein said billing service provider controls authenticating said identity of said callee answering said call, prompting said callee to accept said call with said service, accessing said account by said authenticated identity of said callee, and controlling billing said account accessed by said authenticated identity of said callee for said cost of said service and crediting said cost to said caller account to complete said billed transaction.

16. The system for billing for services according to claim 13, further comprising:

means for prompting said callee to accept said call and incur a charge for said cost indicated in said billed transaction; and means for only completing said billed transaction if said callee accepts said call.

17. The system for billing for services according to claim 13, said means for receiving a request to originate a billed transaction for a service provided by a caller from an origin device further comprises:

means for receiving said request in which said caller specifies said cost for said service and a type of said service.

18. The system for billing for services according to claim 13, further comprising:

means for authenticating an identity of said caller utilizing said origin device; and means for providing said callee with said identity of said caller.

19. The system for billing for services according to claim 13, wherein said means for authenticating an identity of said callee further comprises:

means for authenticating said identity of said callee according to a voice utterance by said callee.

20. The system for billing for services according to claim 13, wherein said means for receiving a request further comprises:

means for receiving a dialed digit request to originate said billed transaction for said caller at said origin device.

21. The system for billing for services according to claim 13, wherein said means for receiving a request further comprises:

means for receiving a voice directed request to originate said billed transaction for said caller at said origin device.

22. The system for billing for services according to claim 13, wherein said means for receiving a request further comprises:

means for receiving a destination line number that is specified to originate said billed transaction for said caller.

23. The system for billing for services according to claim 13, wherein said means for receiving a request further comprises:

means for accessing a profile for said caller; and means for receiving a profile specified request to originate said billed transaction for said caller at said origin device.

24. The system for billing for services according to claim 13, further comprising:

means for prompting said caller at said origin device to select said caller account for crediting a cost of said billed transaction.

25. A computer program product for billing for services provided by a caller originating a call, said computer program product comprising:

a recording medium;

means, recorded on said recording medium, for enabling receipt of a request to originate a billed transaction for a service provided by a caller from an origin device;

means, recorded on said recording medium, for authenticating an identity of a callee answering a call originated by said origin device; and means, recorded on said recording medium, for billing an account accessed by said authenticated identity of said callee for a cost of said service and crediting said cost to a caller account to complete said billed transaction initiated by said origin device when said service provided by said caller is complete.

26. The computer program product for billing for services according to claim 25, further comprising:

means, recorded on said recording medium, for only prompting said caller to provide said service if said callee is one of a plurality of callees authorized to accept said billed transaction for said service.

27. The computer program product for billing for services according to claim 25, further comprising:

means, recorded on said recording medium, responsive to receiving said request to originate said billed transaction at a switch within a trusted telephone network providing a telephone service connection for said call, for establishing a secure communication channel between a billing service provider outside said trusted telephone network and said trusted telephone network, wherein said billing service provider controls authenticating said identity of said callee answering said call, prompting said callee to accept said call with said service, accessing said account by said authenticated identity of said callee, and controlling billing said account accessed by said authenticated identity of said callee for said cost of said service and crediting said cost to said caller account to complete said billed transaction.

28. The computer program product for billing for services according to claim 25, further comprising:

means, recorded on said recording medium, for prompting said callee to accept said call and incur a charge for said cost indicated in said billed transaction; and means, recorded on said recording medium, for only completing said billed transaction if said callee accepts said call.

29. The computer program product for billing for services according to claim 25, further comprising:

means, recorded on said recording medium, for receiving said request in which said caller specifies said cost for said service and a type of said service.

30. The computer program product for billing for services according to claim 25, further comprising:

means, recorded on said recording medium, for authenticating an identity of said caller utilizing said origin device; and means, recorded on said recording medium, for providing said callee with said identity of said caller.

31. The computer program product for billing for services according to claim 25, wherein said means, recorded on said recording medium, for authenticating an identity of said callee further comprises:

means, recorded on said recording medium, for authenticating said identity of said callee according to a voice utterance by said callee.

32. The computer program product for billing for services according to claim 25, wherein said means, recorded on said recording medium, for receiving a request further comprises:

means, recorded on said recording medium, for receiving a dialed digit request to originate said billed transaction for said caller at said origin device.

33. The computer program product for billing for services according to claim 25, wherein said means, recorded on said recording medium, for receiving a request further comprises:

means, recorded on said recording medium, for receiving a voice directed request to originate said billed transaction for said caller at said origin device.

34. The computer program product for billing for services according to claim 25, wherein said means, recorded on said recording medium, for receiving a request further comprises:

means, recorded on said recording medium, for receiving a destination line number that is specified to originate said billed transaction for said caller.

35. The computer program product for billing for services according to claim 25, wherein said means, recorded on said recording medium, for receiving a request further comprises:

means, recorded on said recording medium, for accessing a profile for said caller; and means, recorded on said recording medium, for receiving a profile specified request to originate said billed transaction for said caller at said origin device.

36. The computer program product for billing for services according to claim 25, further comprising:

means, recorded on said recording medium, for prompting said caller at said origin device to select said caller account for crediting a cost of said billed transaction.

37. A method for controlling a billed transaction, comprising:

transferring a call to a destination device with a billed transaction request initiated by a caller placing said call to said destination device, wherein said billed transaction request is for a callee answering said call at said destination device to pay said caller for a service provided by said caller during said call;

authenticating an identity of said callee answering said call at said destination device; and executing said billed transaction according to a billing plan for said authenticated callee identity.

38. The method for controlling a billed transaction according to claim 37, further comprising:

only executing said billed transaction responsive to an authorization by said callee.

39. A method for controlling callee billing, comprising:

receiving a call at a destination device with a billed transaction request initiated by a caller placing said call, wherein said billed transaction request is for a callee answering said call at said destination device to pay said caller for a service provided by said caller during said call; and responsive to an acceptance of said billed transaction request by a callee answering said call at said destination device, transferring an authorization to charge a billing plan accessed according to an authenticated identity of said callee.

* * * * *